United States Patent
Juels et al.

(10) Patent No.: US 7,920,050 B2
(45) Date of Patent: Apr. 5, 2011

(54) PROXY DEVICE FOR ENHANCED PRIVACY IN AN RFID SYSTEM

(75) Inventors: Ari Juels, Brookline, MA (US); Daniel Vernon Bailey, Pepperell, MA (US); Paul Syverson, Silver Spring, MD (US)

(73) Assignee: EMC Corporation, Hopkinton, MA (US)

( * ) Notice: Subject to any disclaimer, the term of this patent is extended or adjusted under 35 U.S.C. 154(b) by 677 days.

(21) Appl. No.: 11/193,729

(22) Filed: Jul. 29, 2005

(65) Prior Publication Data

US 2006/0033608 A1 Feb. 16, 2006

Related U.S. Application Data

(60) Provisional application No. 60/591,981, filed on Jul. 29, 2004.

(51) Int. Cl.
*H04Q 5/22* (2006.01)
(52) U.S. Cl. ........................ 340/10.4; 340/10.1
(58) Field of Classification Search .............. 340/10.1, 340/572.1, 10.32, 5.74, 10.2, 568.1, 572.2, 340/572.3, 10.33; 235/436, 385; 455/1
See application file for complete search history.

(56) References Cited

U.S. PATENT DOCUMENTS

| 6,061,344 | A | 5/2000 | Wood, Jr. | |
|---|---|---|---|---|
| 6,847,892 | B2 * | 1/2005 | Zhou et al. | 701/213 |
| 7,113,594 | B2 * | 9/2006 | Boneh et al. | 380/28 |
| 7,221,900 | B2 * | 5/2007 | Reade et al. | 455/1 |
| 2001/0041551 | A1 * | 11/2001 | Rotzoll | 455/343 |
| 2002/0063622 | A1 * | 5/2002 | Armstrong et al. | 340/10.31 |
| 2002/0080944 | A1 * | 6/2002 | Bedingfield et al. | 379/207.02 |
| 2002/0184200 | A1 * | 12/2002 | Ueda et al. | 707/3 |
| 2003/0105725 | A1 * | 6/2003 | Hoffman | 705/75 |
| 2004/0002305 | A1 * | 1/2004 | Byman-Kivivuori et al. | 455/41.2 |
| 2004/0025032 | A1 * | 2/2004 | Chow et al. | 713/189 |
| 2004/0066278 | A1 * | 4/2004 | Hughes et al. | 340/10.1 |
| 2004/0100359 | A1 | 5/2004 | Reade et al. | |
| 2004/0160324 | A1 | 8/2004 | Stilp | |
| 2004/0222878 | A1 | 11/2004 | Juels | |
| 2004/0223481 | A1 | 11/2004 | Juels et al. | |
| 2005/0099268 | A1 | 5/2005 | Juels et al. | |

OTHER PUBLICATIONS

S.E. Sarma et al., "Radio-Frequency Identification: Security Risks and Challenges," RSA Laboratories, CryptoBytes, vol. 6, No. 1, pp. 1-32, Spring 2003.

(Continued)

*Primary Examiner* — Brian A Zimmerman
*Assistant Examiner* — Yong Hang Jiang
(74) *Attorney, Agent, or Firm* — Ryan, Mason & Lewis, LLP (57) ABSTRACT

A proxy device is disclosed for use in an RFID system comprising a plurality of RFID devices and at least one reader which communicates with the proxy device and one or more of the RFID devices. The proxy device acquires information characterizing at least a given one of the RFID devices, controls the given RFID device so as to at least partially prevent the given RFID device from being read by the reader, and communicates with the reader in a manner which simulates the given RFID device. This advantageously allows the proxy device to implement privacy policies of arbitrary sophistication on behalf of the given RFID device. The proxy device subsequently releases control of the given RFID device so as to permit the given RFID device to again be read by the reader.

29 Claims, 2 Drawing Sheets

OTHER PUBLICATIONS

S.A. Weis et al., "Security and Privacy Aspects of Low-Cost Radio Frequency Identification Systems," Proceedings of the First International Conference on Security in Pervasive Computing, 12 pages, 2003.
A. Juels, "Yoking-Proofs' for RFID Tags," PerCom Workshops, IEEE Computer Society, pp. 138-143, 2004.
"EPC™ Radio-Frequency Identity Protocols Class-1 Generation 2 UHF RFID Protocol for Communications at 860 MHz—960 MHz," Version 1.0.8., pp. 1-93, 2005.
J. Stern et al., "Cryptanalysis of the OTM Signature Scheme from FC'02," Financial Cryptography '03, pp. 138-148, Springer-Verlag, LNCS No. 2742, 2003.
A. Juels, "Minimalist Cryptography for Low-Cost RFID Tags," Security in Communication Networks, (SCN 04), pp. 149-164, Springer-Verlag, LNCS No. 3352, 2004.
"23 mm Glass Transponder," Radio Frequency Identification Systems, Texas Instruments, 1 page, Dec. 2001.
"12 mm Wedge Transponder," Radio Frequency Identification Systems, Texas Instruments, 1 page, Dec. 2001.
M. Jakobsson et al., "Security Weaknesses in Bluetooth," 16 pages, 2001.
"Read/Write Transponder," Atmel, 22 pages, Apr. 2003.
S.A. Weis, "Security and Privacy in Radio-Frequency Identification Devices," Master of Science Thesis, MIT, pp. 1-79, May 2003.
A. Juels et al., "Squealing Euros: Privacy Protection in RFID-Enabled Banknotes," Financial Cryptography, Springer-Verlag, 18 pages, 2003.
P. Golle et al., "Universal Re-encryption of Mixnets," Springer-Verlag , 14 pages, 2002.
D.L. Brock, "The Electronic Product Code (EPC): A Naming Scheme for Physical Objects," White Paper, MIT-AUTOID-WH-002, MIT Auto-ID Center, http://www.autoidcenter.org., pp. 1-21, Jan. 2001.
Auto-ID Center, Technical Report, "13.56 MHz ISM Band Class 1 Radio Frequency Identification Tag Interface Specification: Recommended Standard, Version 1.0.0," MIT-AUTOID-TR-011, MIT Auto-ID Center, http://autoidcenter.org, pp. 1-31, Feb. 2003.
S. Garfinkel, "An RFID Bill of Rights," Technology Review, p. 35, Oct. 2002.
S.E. Sarma et al., "RFID Systems, Security & Privacy Implications," White Paper, MIT-AUTOID-WH-014, MIT Auto-ID Center, pp. 1-16, Nov. 2002.
D.W. Engels, "HF Identity Tag Action Group: Scope and Deliverables," Technical Report, MIT-AUTOID-TR-020, MIT Auto-ID Center, pp. 1-5, Jul. 2003.
S.E. Sarma, "Towards the 5¢ Tag," White Paper, Technical Report MIT-AUTOID-WH-006, MIT Auto ID Center, pp. 1-19, Nov. 2001.
R. Agrawal et al., "Privacy-Preserving Data Mining," Proc. of the ACM SIGMOD Conference on Management of Data, ACM Press, 12 pages, 2000.
D. Chaum, "Untraceable Electronic Mail, Return Addresses, and Digital Pseudonyms," Communications of the ACM, vol. 24, No. 2, 9 pages, Feb. 1981.
M. Mealling, "Auto-ID Object Name Service (ONS) 1.0," Auto-ID Working Draft, 17 pages, Aug. 2003.
M.G. Reed et al., "Protocols Using Anonymous Connections: Mobile Applications," In Security Protocols, Proceedings of the 5th International Workshop, Springer-Verlag LNCS 1361, 11 pages, 1997.
S. Clark et al., "Auto-ID Savant Specification 1.0," Auto-ID Center, pp. 1-59, Sep. 2003.
K.P. Fishkin et al., "Some Methods for Privacy in RFID Communication," 1st European Workshop on Security in Ad-Hoc and Sensor Networks, ESAS, pp. 1-13, 2004.
A. Juels et al.,"The Blocker Tag: Selective Blocking of RFID Tags for Consumer Privacy," 8th ACM Conference on Computer and Communications Security, ACM Press, 16 pages, 2003.
Auto-ID Center, Technical Report, "860 MHz-960MHz Class 1 Radio Frequency Identification Tag Radio Frequency & Logical Communication Interface Specification: Recommended Standard, Version 1.0.0," MIT-AUTOID-TR-007, MIT Auto-ID Center, pp. 1-17, Nov. 2002.
D. McCullagh, "RFID Tags: Big Brother in Small Packages," CNET, www.news.com, 3 pages, Jan. 2003.
G. Romen, "Nokia Unveils RFID Phone Reader," RFID Journal, 2 pages, Mar. 17, 2004.
F. Stajano et al., "The Resurrecting Duckling: Security Issues for Ad-hoc Wireless Networks," 7th International Workshop Proceedings, pp. 1-11, 1999.
J. Stanley, "Chip Away at Privacy: Library Tracking System Spawns Big Brother Ire," San Francisco Chronicle, 1 page, Jul. 2, 2004.
R. Stapleton-Gray, Ph.D., "Would Macy's Scan Gimbels? Competitive Intelligence and RFID," Technical Report, www.stapleton-gray.com, pp. 1-7, 2003.
K. Takaragi et al., "An Ultra Small Individual Recognition Security Chip," IEEE, vol. 21, Issue 6, pp. 43-49, 2001.
R. Tuchinda, "Security and Privacy in the Intelligent Room," Master's Thesis, M.I.T., pp. 1-74, May 15, 2002.
"RFID, Privacy, and Corporate Data," RFID Journal, www.rfidjournal.com, 5 pages, Jun. 2, 2003.

* cited by examiner

PROXY DEVICE FOR ENHANCED PRIVACY IN AN RFID SYSTEM

RELATED APPLICATIONS(s)

The present application claims the priority of U.S. Provisional Patent Application Ser. No. 60/591,981, filed Jul. 29, 2004 and entitled "High-Power Proxies for Enhancing RFID Privacy," the disclosure of which is incorporated by reference herein.

The present application is also related to U.S. patent application Ser. No. 10/782,309, filed Feb. 19, 2004 and entitled "Low-Complexity Cryptographic Techniques For Use With Radio Frequency Identification Devices," U.S. patent application Ser. No. 10/673,540, filed Sep. 29, 2003 and entitled "Method And Apparatus For Selective Blocking Of Radio Frequency Identification Devices," and U.S. patent application Ser. No. 10/915,189, filed Aug. 10, 2004 and entitled "Radio Frequency Identification System With Privacy Policy Implementation Based On Device Classification," which are commonly assigned herewith and incorporated by reference herein.

FIELD OF THE INVENTION

The present invention relates generally to systems comprising radio frequency identification (RFID) tags or other types of RFID devices, and more particularly to techniques for enhancing user privacy in such systems.

BACKGROUND OF THE INVENTION

A conventional RFID tag typically comprises an integrated circuit transceiver capable of transmitting a unique serial number or other identifying information to a nearby reader in response to a query from the reader. Many RFID tags are "passive" in that they do not include a battery or other power source, but instead obtain the power necessary to operate from the query signal itself.

Ongoing RFID tag development efforts have led to significant cost and size reductions, which should result in a rapid proliferation of RFID tags into many new areas of use. For example, RFID tags are expected to replace printed barcodes in consumer product applications. The Electronic Product Code (EPC) tag is a form of RFID device that is emerging as a successor to the printed barcode. EPC tags are an evolving standard under development by an organization called EPCglobal, a joint venture between the UCC and EAN, the organizations that oversee barcode standards in the U.S. and Europe, respectively. An EPC is the form of identifier that an individual EPC tag emits as prescribed by the EPCglobal standard. An EPC includes not just the information contained in a conventional printed barcode, namely the manufacturer and type of a particular product, but also a unique serial number. Additional details can be found in the current version of the EPCglobal standard document, "EPC™ Radio-Frequency Identity Protocols Class-1 Generation-2 UHF RFID Protocol for Communications at 860 MHz-960 MHz," Version 1.0.8, 2005.

The unique serial number of an EPC tag associated with an object can serve as a pointer to a database entry containing a detailed history of the object. Thanks to the features of automated scanning and unique identification, RFID systems promise fine-grained tracking of inventory on an unprecedented scale.

Unfortunately, such capabilities also introduce a strong potential for various forms of privacy infringement, such as invasive physical tracking and inventorying of individuals. Similar threats are posed to the privacy of corporate data.

Conventional approaches, such as the use of "kill" control codes (e.g., identification numbers or PINs) to deactivate tags or the use of Faraday cages to shield tags from readers, fail to protect user privacy in a manner which retains the full benefits of the tags in a variety of environments. Other approaches involve the use of sophisticated cryptographic functionality that is incompatible with the limited computation and memory resources of EPC tags and other simple RFID devices.

Illustrative embodiments of the inventions disclosed in the above-cited U.S. patent application Ser. Nos. 10/782,309, 10/673,540 and 10/915,189 address the above-noted problems of conventional practice through techniques referred to as minimalist cryptography, selective blocking and soft blocking, respectively. Despite the considerable advantages provided by these techniques, a need remains for further improvements in the form of additional techniques capable of preserving user privacy in RFID device applications.

SUMMARY OF THE INVENTION

The present invention in accordance with one aspect thereof provides techniques for enhancing user privacy in an RFID system. The RFID system generally includes a plurality of RFID devices and at least one reader which communicates with one or more of the RFID devices. The system further includes at least one proxy device. The proxy device acquires information characterizing at least a given one of the RFID devices, controls the given RFID device so as to at least partially prevent the given RFID device from being read by the reader, and communicates with the reader in a manner which simulates the given RFID device. This advantageously allows the proxy device to implement privacy policies of arbitrary sophistication on behalf of the given RFID device. The proxy device subsequently releases control of the given RFID device so as to permit the given RFID device to again be read by the reader.

In an illustrative embodiment of the invention, the information characterizing the given RFID device comprises at least an identifier of that device. The proxy device may acquire the identifier by, for example, reading the given RFID device in substantially the same manner that the reader would read the given RFID device. Alternatively, the proxy device may acquire the identifier from the reader, or it may be provided by the given RFID device upon authentication of the proxy device to the given RFID device.

The given RFID device may be controlled by relabeling it with a new identifier. Such relabeling may therefore involve, for example, altering its current identifier as stored therein. More particularly, the identifier may be altered by replacing it with a pseudonym generated by the proxy device. The proxy device could assign different pseudonyms for different timeslots to the given RFID device. Such pseudonyms could be generated uniformly at random by the proxy device, or as symmetric-key ciphertexts based on a master key held by the proxy device, or using other techniques.

In other embodiments, the identifier may be altered by the given RFID device responsive to input received from the proxy device. For example, the given RFID device may generate a new identifier responsive to an update command received from the proxy device. More specifically, the given RFID device may generate the new identifier as a pseudonym determined using a counter maintained in the given RFID device. As another example, the pseudonym may be generated in the proxy device at least in part as a function of input information obtained from the given RFID device. In such an arrangement, the pseudonym may be accepted by the given RFID device only upon confirmation by the given RFID device that the pseudonym was generated using the input information.

As indicated above, a proxy device can implement privacy policies of arbitrary sophistication that would otherwise be difficult or highly impractical to implement in conventional RFID systems. For example, policies involving robust cryptographic authentication algorithms, release of RFID device information only when the RFID device is in particular geographic locations, or release of RFID device information for an RFID device not actually carried by a corresponding user, can be easily implemented using a proxy device configured in accordance with the present invention.

These and other features and advantages of the present invention will become more readily apparent from the accompanying drawings and the following detailed description.

DETAILED DESCRIPTION

The present invention will be described herein with reference to an exemplary RFID system in which multiple RFID devices communicate with an RFID device reader. It is to be appreciated, however, that the invention is not restricted to use in this or any other particular RFID system configuration.

The term "RFID device" as used herein is intended to include an RFID tag or any other type of device configurable for transmission of device-identifying information via radio frequency communications. Although the following description will refer primarily to EPC tags, it is to be understood that the techniques disclosed are applicable to other types of RFID tags, and more generally applicable to other types of RFID devices. Also, the terms "radio frequency" or "RF" as used herein are not intended to be restricted to any particular frequency range, but are instead intended to be construed more generally so as to encompass any contiguous or non-contiguous arrangement of one or more signal frequencies suitable for supporting wireless communication between at least one device and at least one reader.

As described in the above-cited U.S. patent application Ser. No. 10/915,189, a given RFID device in an illustrative embodiment of the invention may have one or more of a number of different classifications. For example, the given RFID device may be classified as one of public, private, blocker, unblocker, etc. The classification of the given RFID device may be dynamic, that is, it can vary over time. Also, it is possible for a given RFID device to have multiple classifications at the same time, depending upon the particular set of classifications in use. The present invention, however, does not require the use of these or any other RFID device classification techniques.

The device-identifying information associated with a given RFID device may be an EPC, a serial number or any other type of identifier. It should be noted that not every identifier in a given set of unique identifiers need have a corresponding realized device.

The term "identifier" as used herein is intended to include a pseudonym of the type described in the above-cited U.S. patent application Ser. No. 10/782,309. In addition, an identifier is intended to include any information suitable for providing an indication of a classification of a particular RFID device.

The term "reader" as used herein is intended to include any type of device capable of interacting with an RFID tag or other device so as to receive device-identifying information therefrom.

1. Example of an RFID System

Figure 1:
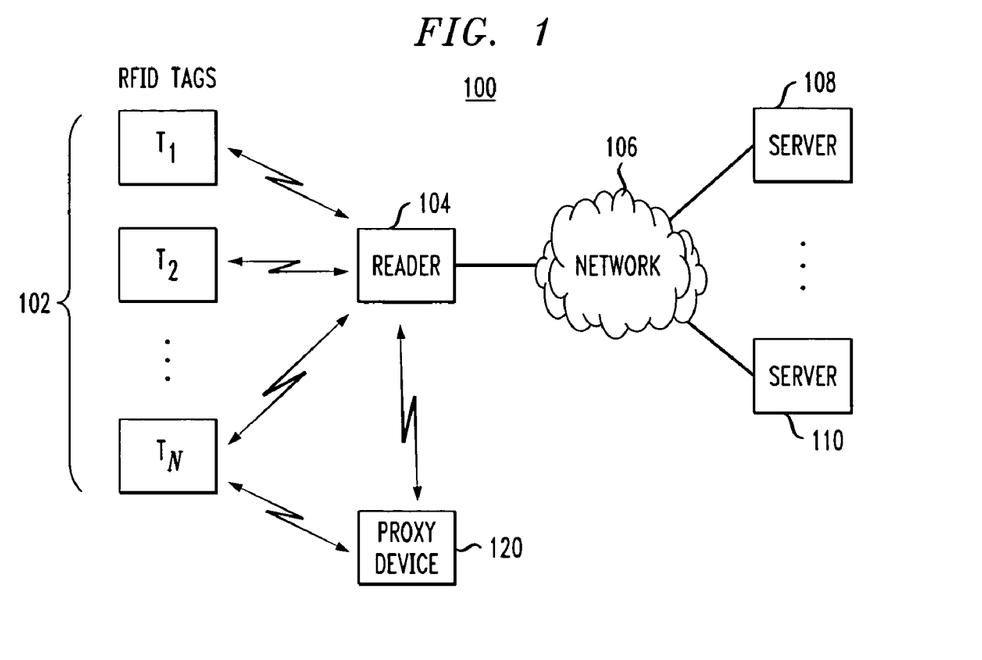
FIG. 1 is a simplified block diagram of an exemplary RFID system in which the present invention is implemented in one embodiment.

FIG. 1 shows an RFID system 100 in which the present invention is implemented. The system 100 includes a number N of RFID tags 102, more particularly denoted by their associated tag identifiers $T_1, T_2, \ldots T_N$, and an RFID reader 104. The tags 102 may comprise EPCglobal Class-1 Generation-2 UHF tags or other types of EPC tags, or more generally other types of RFID devices. The reader 104 communicates with the tags 102 and receives identifying information therefrom, in the form of one or more transmitted identifiers. The reader 104 is coupled via a network 106 to servers denoted 108, 110.

The system 100 further comprises a proxy device 120. The proxy device 120, an example of which is referred to herein as an RFID enhancer proxy (REP), communicates with one or more of the RFID tags 102 and with the reader 104. Although shown in FIG. 1 as communicating with only tag $T_N$, the proxy device 120 can more generally be configured to communicate with any desired grouping of one or more of the tags in system 100. The operation of the proxy device 120 will be further described below in conjunction with FIGS. 2 and 3. Generally, proxy device 120 acquires identifiers or other information characterizing at least a given one of the RFID tags 102, and controls the given tag so as to at least partially prevent that tag from being read by the reader. As will be noted elsewhere herein, the term "controls" in this context is intended to be construed broadly, so as to encompass a wide variety of arrangements in which the proxy device interferes with the normal operation of the tag. While controlling the given tag, the proxy device itself communicates with the reader, in a manner that simulates the presence of the given tag but enforces a desired privacy policy. The proxy device subsequently releases control of the given tag, thereby permitting the tag to be read by the reader in a normal manner.

Figure 2:
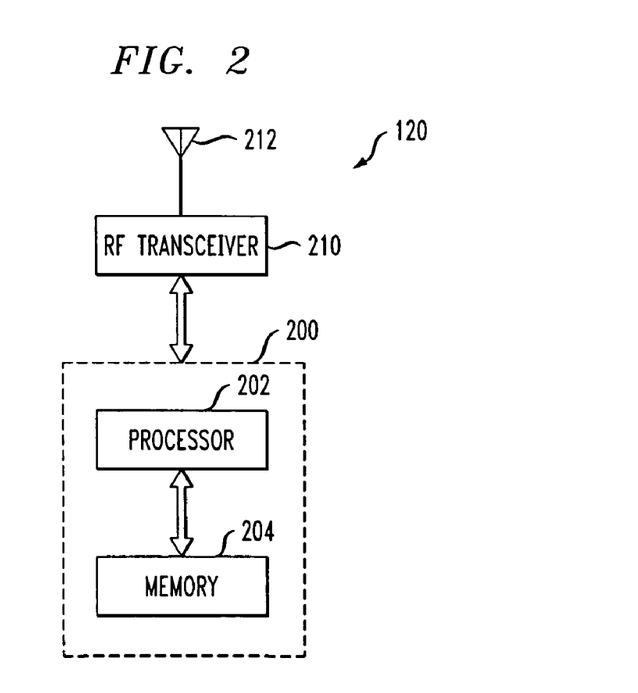
FIG. 2 illustrates one possible implementation of a proxy device of the FIG. 1 system.

FIG. 2 shows one possible implementation of the proxy device 120 of the FIG. 1 system. The proxy device 120 in this implementation includes a processing block 200, comprising a processor 202 coupled to a memory 204, an RF transceiver 210, and an antenna 212. One or more of these elements may be implemented in whole or in part as a conventional microprocessor, digital signal processor, application-specific integrated circuit (ASIC) or other type of circuitry, as well as portions or combinations of such circuitry elements. Software programs for controlling the operation of the proxy device 120 may be stored in the memory 204 and executed by the processor 202.

Figure 3:
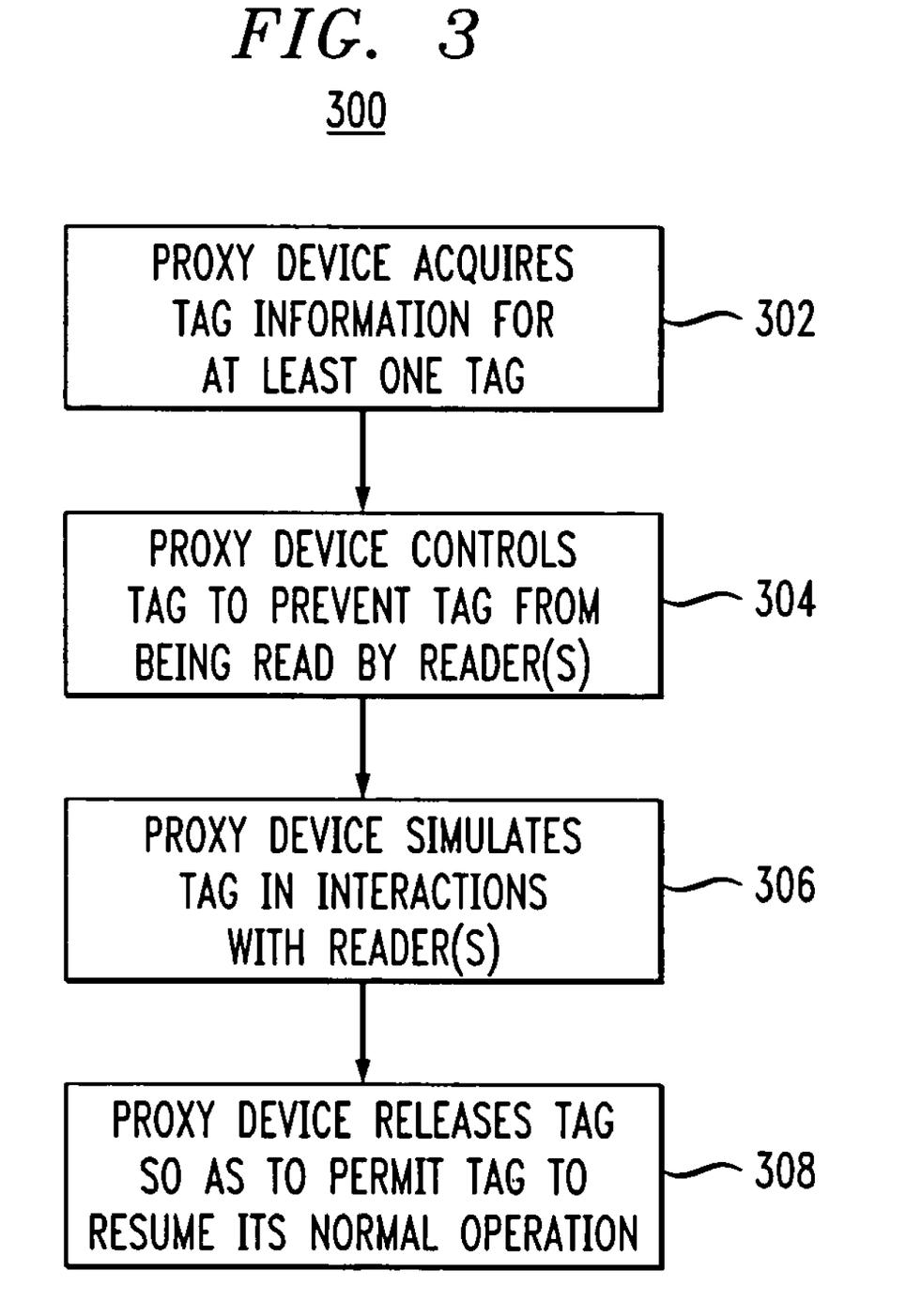
FIG. 3 is a flow diagram showing the operation of a proxy device of the FIG. 1 system in an illustrative embodiment of the invention.

FIG. 3 shows a flow diagram 300 which outlines the operation of proxy device 120 in the illustrative embodiment.

In step 302, the proxy device 120 acquires tag information, such as an EPC or other tag identifier, for at least one tag. For example, the proxy device 120 may acquire such information by communicating with a particular tag, such as tag $T_N$ as shown in FIG. 1. Alternatively, such information may be communicated to the proxy device through other channels.

In step 304, the proxy device controls the tag so as to prevent the tag from being read by the reader 104, and possibly any additional readers of the system. As will be described in greater detail below, this step may involve, for example, the proxy device temporarily altering the tag identifier or otherwise preventing the tag from communicating in its normal mode of operation with the reader(s). It should be noted that this step may be implemented such that the reader is prevented from reading only a portion of the full readable information contained in the tag. Such an arrangement is an example of one in which a tag is controlled so as to "at least partially prevent" that tag from being read by a reader. Another example may include an arrangement in which the proxy device intercepts reader queries to protected tags, using an approach referred to herein as "block-and-simulate." These and other arrangements are considered to be within the broad scope of the terms "controls" or "controlling" as applied to a given tag or other RFID device.

In step 306, the proxy device 120 simulates the tag in interaction with the reader(s). This advantageously allows implementation of arbitrary privacy policies on behalf of the proxy user. The proxy device in the illustrative embodiment is assumed to have significantly more processing power than a typical tag, and therefore can implement sophisticated privacy policies involving, for example, cryptographic authentication functionality, on behalf of one or more tags owned by an associated user.

In step 308, the proxy device 120 releases the tag so as to permit the tag to resume its normal operation.

More detailed examples of the operation of proxy device 120 will be described in the REP description of Section 2 below.

It should be noted that the proxy device 120 need not take on a particular physical form, and can instead be implemented as any type of processing device, including, for example, a mobile telephone, a personal digital assistant (PDA), a mobile email device, a portable computer, a hardware-based authentication token such as an RSA SecurID® token commercially available from RSA Security Inc. of Bedford, Mass., U.S.A., or any other type of processing device. Such processing devices can be readily configured to operate as proxy devices in accordance with the invention.

The proxy device 120 in this illustrative embodiment communicates with the tags 102 and the reader 104 using the same RF communication protocols used for conventional tag-to-reader and reader-to-tag communication. It is to be appreciated, however, that the proxy device can be configured to support a wide variety of other types of protocols, in any combination. For example, the proxy device may include wireless network interface capability, using protocols such as IEEE 802.11, Bluetooth, GSM, UMTS, etc. The proxy device may therefore provide a bridge between system 100 and external wireless networks not shown.

A given RFID tag 102 in system 100 generally includes circuitry comprising memory, processing logic and an RF transceiver. These elements may be configured in a manner similar to that used in conventional RFID tags.

One or more of the tags 102 may each comprise a so-called "blocker tag" configured with an ability to block the operation of a singulation algorithm utilized by the reader 104 in order to provide enhanced privacy for a user of the tag, as described in the above-cited U.S. patent application Ser. No. 10/673,540. The present invention, however, does not require the use of such blocker tags.

One or more of the tags 102 may also or alternatively implement minimalist cryptography, soft blocking, or other techniques described in the above-cited U.S. patent application Ser. Nos. 10/782,309 and 10/915,189. Again, the present invention does not require the use of such techniques.

The network 106 may represent a global computer network such as the Internet, a wide area network (WAN), a local area network (LAN), a satellite network, a telephone or cable network, or various portions or combinations of these and other types of networks. The servers 108, 110 may be conventional processor-based information processing devices of a type conventionally utilized in conjunction with RFID readers in an RFID system.

The particular number N of tags 102 in the system 100 is purely arbitrary, and the system can be configured to support any desired number of tags. Also, although only a single reader 104 is shown in the figure for simplicity and clarity of illustration, the system will typically include multiple readers. Furthermore, it should be noted that a given reader need not be connected to a network, and may instead operate as a stand-alone device, or may be only intermittently connected to the network. Also, a given reader can be directly connected to a server or other system element, rather than connected thereto over a network as illustrated in the example system 100.

A typical RFID reader is generally only able to communicate with a single RFID tag at a time. In effect, however, the reader may be viewed as broadcasting a query to all of the tags 102 at once. If more than one tag responds to a query by the reader, the reader detects a collision and executes a singulation algorithm which allows the reader to communicate with the conflicting tags one at a time.

Conventional RFID tag systems may operate at a frequency of, for example, either 13.56 MHz or 915 MHz, and may utilize, for example, ALOHA-type singulation algorithms or tree-walking singulation algorithms. Other frequencies, such as 125 kHz and 2.45 GHz, are also used, and employ similar singulation algorithms. Such singulation algorithms are known in the art, and will therefore not be further described herein. The invention can be utilized with a reader incorporating one of these known singulation algorithms, or a reader incorporating another type of singulation algorithm, or any other type of reader, including a reader that does not singulate tags. Thus, it is to be appreciated that the invention does not require the use of singulation.

As indicated above, one particular embodiment of a proxy device such as device 102 is referred to herein as a REP. In Section 2 below, the operation of the REP is described in further detail. The REP and its associated functionality as described herein should not be viewed as requirements of the invention, but are instead presented by way of example. Numerous alternative proxy device configurations will be apparent to those skilled in the art from the teachings provided herein.

2. RFID Enhancer Proxy (REP)

As indicated previously, the REP is an example of what is more generally referred to herein as a proxy device. Briefly stated, a REP assumes the identities of tags and simulates them by proxy. By merit of its greater computing power, the REP can enforce more sophisticated privacy policies than those available in tags. As a side benefit, it can also provide more flexible and reliable communications in RFID systems.

An important advantage of the REP of this embodiment is that it is a trusted device, and therefore is not vulnerable to attacks involving malicious exchange of data between RFID tags. Vulnerability to such an attack is a significant drawback associated with the conventional personal re-encryption devices disclosed in P. Golle et al., "Universal re-encryption for mixnets," T. Okamoto, editor, RSA Conference-Cryptographers' Track (CT-RSA), pp. 163-178, Springer-Verlag, 2004.

The REP assumes the identities of RFID tags under its control. In particular, it loads their identifying information and then simulates the tags in the presence of one or more readers in order to enforce a privacy policy on behalf of the REP owner. Suitable privacy policies may include, for example, a requirement for the reader and the REP to participate in an authentication protocol more sophisticated than that which an ordinary tag implements. When a given tag is no longer to be simulated by a REP, the tag may reassume its identity and operate in a conventional manner.

For consumer applications, it will often be desirable for the REP to continually rewrite the identifiers transmitted by tags under its control. The REP may, for example, write ciphertexts or random pseudonyms to tags. Such an approach is similar to approaches described in the above-cited P. Golle et al. reference, and in A. Juels et al., "Squealing Euros: Privacy protection in RFID-enabled banknotes," Financial Cryptography '03, pp. 103-121, Springer-Verlag, 2003, LNCS No. 2742. These references propose re-encryption of ciphertexts on tag identifiers by computationally powerful and potentially untrusted external computing devices. In contrast to these proposals for tag re-encryption, however, we consider the REP as a trusted personal device. This advantageously removes the need for a reliance on public-key cryptography, as will be described in greater detail below.

The REP in the illustrative embodiment performs the following operations:

1. Tag Acquisition. By way of example, when the owner of a REP and RFID tag wishes the REP to simulate the tag, the REP acquires all of the necessary tag information and places the tag in a state permitting the REP to act as its proxy. The main technical challenge occurs when the tag has associated secrets, like PINs for access control or "killing" that must be transferred securely.

2. Tag Relabeling. The REP changes the identifiers on tags in its control so as to prevent surveillance of these tags. Relabeling introduces various integrity problems, particularly the need to prevent adversarial re-writing of tags. This illustrative embodiment uses a simple technique for preventing an adversary from swapping the identities of two different tags, e.g., swapping the identifiers on two medications with differing dosages. As previously indicated, the personal re-encryption device of the above-cited Golle et al. reference is vulnerable to this type of attack. The approach described in the above-cited A. Juels et al. reference uses special physical prevention mechanisms to address this type of attack. The technique of this illustrative embodiment, which involves random input from the tag in the creation of pseudonyms, works even when tags do not have access-control features. As one possible alternative, tags could instead be put in a "sleep" mode, as will be described in Section 2.5 below.

3. Tag Simulation. The REP simulates tags in interaction with readers. The REP may also simulate spurious tags to prevent leakage of information about the number of tags carried by its owner. As a REP is assumed to be a powerful device, it can enforce any privacy policy desired by its owner. A wide variety of suitable privacy policies would be readily apparent to those skilled in the art, and accordingly are not described in detail herein. Examples include robust public-key based authentication schemes.

4. Tag Release. When the owner of a REP wishes it no longer to simulate a tag, the REP releases its control and reconfigures the tag to a normal mode of operation.

It should be noted that blocker tags as described in the above-cited U.S. patent application Ser. Nos. 10/673,540 and 10/915,189 can serve as alternatives to REPs for consumer privacy protection. REPs, however, have a number of features that make them an attractive alternative to blocker tags. For example, if a conventional tag temporarily exits the broadcast range of a blocker tag, the former is subject to complete compromise. By contrast, a conventional tag under the control of a REP will merely go without an identity change during this period. As another example, blocker tags are typically most effective as a standard implemented on both tags and readers, while a REP requires only tag-based support, and can be compatible with any type of reader. However, it is to be appreciated that a blocker tag may be configured to implement REP functionality as described herein, and a REP may be configured to implement blocker tag functionality.

A REP in this illustrative embodiment thus functions as a proxy for one or more RFID tags. As such, it is able to simulate these tags and therefore enforce privacy policies of arbitrary sophistication. Additionally, and quite importantly for many applications, a REP, which is assumed to be a device having significant computation and memory resources, can serve as a much more reliable interface for transmitting RFID data than an RFID tag. Stated more generally, a REP can serve as a more trustworthy conduit for RFID data than the tags it controls. This can be particularly valuable in, e.g., environments in which there are physical impediments to RFID scanning. Metals and liquids can both interfere with RFID scanning, for instance; manufacturers have already confronted challenges in scanning such items as cans of drinking soda. The REP alleviates such problems.

The above-listed operations of the REP, namely, tag acquisition, tag relabeling, tag simulation and tag release, will now be described in greater detail. It should be understood that this particular set of operations, and the details thereof as outlined below, are merely illustrative examples associated with one particular embodiment of a proxy device in accordance with the invention. Other embodiments may implement only a subset of these operations, use additional or alternative operations, and so on.

2.1 Tag Acquisition

Acquisition of a tag by a REP involves transfer of a complete set of tag data, which typically comprises at least the tag identifier. For tags that simply broadcast identifiers and other public information, this is a straightforward matter in that the REP need merely scan the tag. Where it becomes more complicated is when a tag has associated secrets, particularly PINs required to implement secure tag operations such as writing and "killing." The transfer of these data may take place, for example, in the following ways:

1. The tag data may be transferred directly to the REP from a trusted higher powered device such as a reader. In all cases, care should be taken of course to protect the privacy and integrity of data during this transfer. At checkout from a shop, for example, private data associated with the tags on purchased products might be communicated by the checkout register directly to the REP via, e.g., a Bluetooth link. In a supply chain, before shipment to a supply-chain partner, a pallet of tagged items might itself be tagged with a REP. The REP is programmed with private data about the tags in its pallet from a reader. This data transfer may take place using the RFID data transport or another physical layer such as Bluetooth, ZigBee, or IrDA.

2. The tag data may be released by the tag on suitable out-of-band authentication of the REP to the tag, or this data transfer may take place in an environment with adequate compensating controls. There are several channels by which the RFID reader might authenticate itself to the tag as a trusted device. If tags bear printed keys, then optical scanning of these keys might serve this function. A more convenient alternative might be release of tag data upon physical contact or proximity between the REP and the tag in accordance with the "resurrecting duckling" paradigm of F. Stajano et al., "The resurrecting duckling: Security issues for ad-hoc wireless networks," 7th International Workshop on Security Protocols, pp. 172-194, Springer-Verlag, 1999, LNCS No. 1796. Indeed, researchers have demonstrated methods by which tags may be able to ascertain roughly whether a reader is in close proximity. See, for example, K. P. Fishkin et al., "Some methods for privacy in RFID communication," 1st European Workshop on Security in Ad-Hoc and Sensor Networks (ESAS 2004), pp. 42-53, 2004.

2.2 Tag Relabeling

As explained above, relabeling of tags by the REP protects against privacy compromise that may result through direct tag scanning. One way to accomplish this is to have the REP re-encrypt a public-key ciphertext carried by a tag, using re-encryption techniques such as those described in the above-cited P. Golle et al. reference. This illustrative embodiment, however, in which the REP serves as a proxy, permits a simpler approach involving the assignment of changing pseudonyms to tags. In particular, for timeslot t, the REP can assign a k-bit pseudonym $p_{t,i}$ to tag i. Time here would be maintained by the REP alone, assuming it is infeasible for simple tags to keep time. This pseudonym may be generated uniformly at random by the REP and stored in a table in association with the tag identity. Alternatively, it could be computed as a k-bit symmetric-key ciphertext based on a master key a held by the REP. For example, the pseudonym could be computed as $p_{t,i}=E_a[t,i]$.

The approach of re-encryption or more generally, relabeling of tags, however, introduces a serious security problem, that of data integrity. Because tags in the illustrative embodiment are assumed to be computationally too weak to authenticate re-writing entities, it is hard to enforce write-control permissions on tags that preclude adversarial tampering. This means that an attacker can corrupt tag data.

Writing of tag data is typically a PIN-protected process in RFID tags. This mitigates the risk of malicious corruption of tag data, but does not eliminate it. An adversary can potentially intercept REP-to-tag communications and thus learn the write PIN for the tag. Alternatively, if attacking at sufficiently close range, the adversary can hijack a write session between the REP and tag. However, provided that k is sufficiently large, i.e., pseudonyms are long enough, an attacker has very little chance of being able to forge a pseudonym.

More serious is the possibility of a swapping attack, in which an adversary exchanges the ciphertexts $p_{t,i}$ and $p_{t,j}$ between two tags i and j. This can have very serious consequences. It suffices to consider the possibility of an attacker exchanging ciphertexts associated with two medications or two spare aircraft parts. Conventional techniques involving re-encryption of ciphertexts, such as those described in the above-cited P. Golle et al. reference, have been unable to address this attack, and have indeed left its resolution as an open problem.

In the case where the PIN associated with a tag is locked, i.e., not subject to alteration, the PIN itself can serve as a kind of authenticator for the tag. Authentication techniques of this type are disclosed in U.S. patent application Ser. No. 11/191,633, filed Jul. 28, 2005 and entitled "Methods and Apparatus for RFID Device Authentication," which is incorporated by reference herein. Thus, a PIN can be used as a mechanism to defend against swapping attacks, in that if a tag is discovered to carry a pseudonym that does not match its PIN, then it may be presumed that a swapping attack has occurred.

There are a number of problems associated with the use of PINs to defend against swapping attacks. First, a frequently-used PIN is subject to compromise, and a compromised PIN is effectively a kind of static identifier. An attacker capable of testing the correctness of a PIN can use it to track a tag. Of course, if a PIN is not used to authenticate the operation of identifier-writing, but only to test periodically for swapping, then the risk of PIN compromise is diminished. A second, more serious problem is the basic one of PIN management. We have already noted that tag acquisition may need to involve out-of-band transfer of tag secrets. In general, management of tag PINs is like the general problem of key management in data-security systems. It is conceptually simple, but operationally difficult. Hence, it seems very likely that consumers will carry RFID tags that do not have associated PINs, or will not know the associated PINs of their tags.

The illustrative embodiment of the invention provides a simple defense against identifier swapping that works even when write access to tags is universal. The idea is for a tag i to participate itself in the generation of a given pseudonym $p_{t,i}$. In principle, if the tag itself could perform symmetric-key encryption under an appropriate cipher E, then the data-integrity problem would be solved. The tag would not need to have its pseudonyms updated by the REP. Cryptography of this kind, however, as we have explained, is well beyond the reach of low-cost tag capabilities.

Tags can, however, generate a certain amount of randomness. Consider a protocol in which a tag generates a new pseudonym $p_{t,i}$ for a counter t maintained in the tag. If it receives an "update" command from the REP, along with a valid write key, the tag transmits $p_{t,i}$ to the reader and adopts $p_{t,i}$ as its new pseudonym. In order to prevent desynchronization due to an interrupted session, a tag might await a final acknowledgment from the reader before effecting the update. This approach would render swapping attacks infeasible, as the REP, and thus an adversary, would be unable to dictate tag pseudonyms.

In practice, tags are capable of generating only a limited number of random bits in the course of a given session. Moreover, much of the randomness that a tag generates is already allocated to other protocol requirements. A tag may therefore be unable to generate a full-length random pseudonym in each session.

Even partial generation of a pseudonym by a tag, however, can help alleviate the risk of swapping attacks. For example, a tag might emit a random nonce r of length k'<k before accepting the writing of a new pseudonym. The tag then only accepts a new pseudonym if it "matches" this nonce, e.g., if the last bits of the pseudonym are equal to r. As an alternative, a tag might simply "declare" the last bits of its pseudonym to be r and accept only the other bits from the reader. In other words, a tag can participate partially in the generation of its pseudonyms. An adversary attempting to swap pseudonyms, then, will be unable to do so unless it can locate a pair of tags simultaneously emitting the same nonces.

The probability of successful attack by an adversary, then, is a function of the number of tags N managed by a REP, the number of timeslots s available to the adversary for its attack, and the bit-length k'. Consider, for instance, a pallet carrying some 100 tags relabeled every minute, and seeking protection against attacks lasting up to one day (1440 minutes), and employing tags that generate 32-bit nonces. The probability that a given tag shares a random pseudonym with any of the 99 others may be crudely bounded above by $99/2^{32}$. Thus the probability of a successful swapping attack in this case is easily seen to be less than $(1-(1-99/2^{32}))\times 1440 < 0.000034$.

Even if an attacker cannot successfully initiate a swapping attack, corruption of tag data has a second effect, namely, denial of service. If an attacker is able to implant a pseudonym in a tag, the tag effectively becomes desynchronized with the REP, in that the REP no longer recognizes the tag's pseudonym. If the REP were consequently to halt rotation of new pseudonyms into a tag, a breach of privacy could result, since the tag identifier would remain static. A REP might alert a user to unexpected desynchronization events of this kind by emitting a warning tone, for instance. Alternatively, a REP might continue to relabel tags even if it does not know their true underlying identifiers. The REP can, of course, simply generate temporary identifiers for tags it does not recognize. This might have an undesirable spillover effect if a REP relabels tags that do not belong to its owner.

A secondary effect of a corruption attack is that the REP cannot properly release tags. If it does not recognize their pseudonyms, it cannot manage them properly. Thus, one of two approaches might be needed for tag restoration: (1) If the REP possesses PINs for the tags in its control, it can try to match tags to PINs via exhaustive search, or (2) Manual intervention on the part of the user might be necessary, e.g., the user might have to key in a printed product code from items that the REP has "lost." Given the current, and probably persistent imperfections in RFID, we expect some level of back-up identifier recovery and manual intervention to occur regularly. Since denial-of-service attacks would likely be a rarity, anyway, they would probably constitute little more than a nuisance in the system.

One way to achieve privacy protection of REP-to-tag communications is to have the tag generate a random value R and send it on the tag-to-REP channel. The REP can then protect transmission of a message on the REP-to-tag channel, which is typically higher power than the tag-to-REP channel, as the REP can then transmit the write PIN XORed with R. Techniques such as these can in principle prevent compromise of write PINs for tags via long-range eavesdropping, and thus reduce the overall threat of data corruption. They do not, however, address the problems of short-range eavesdropping and hijacking.

A stronger approach to data integrity is possible using, for example, the minimalist cryptography of the above-cited U.S. patent Ser. No. 10/782,309 to establish shared secrets between tags and the REP. On top of this might be layered a lightweight message authentication code (MAC). Such a combination of techniques could be used to permit the REP and tag to authenticate new pseudonyms.

2.3 Tag Simulation

Once the REP has acquired a tag, it can, of course, simulate it as desired in the presence of an RFID reader. As explained above, this has the benefit of making tag reading more reliable. The REP, which is assumed to have greater processor and memory resources than a tag, can transmit information to a reader more reliably than a tag. The REP might essentially enforce the kind of data filtering envisioned in the soft blocking approach described in the above-cited U.S. patent Ser. No. 10/915,189. Soft blocking, however, is implemented in an illustrative embodiment using, e.g., a universal set of policy conventions. A REP, by contrast to such an embodiment, can achieve a wholly personalized set of privacy policies. Additionally, a REP can enforce these policies in the presence of any reader, even a malicious one.

The following are two examples of REP capabilities that are not provided in conventional approaches.

1. Geographical conditioning. A REP may make decisions about whether to release information based on its geographical location. For example, a REP might release information about a pallet's RFID tags only when the pallet arrives at its destination. There is a variety of channels by which the REP might determine whether or not it is present at its destination, e.g., (1) a built-in GPS unit; (2) authenticated transmissions from readers; or (3) an authenticated notification from another protocol such as Bluetooth.

2. Object simulation. To deceive attackers, a REP may simulate RFID tags associated with objects that the user does not possess. For example, a consumer can "carry" information about an object by simulating it. When the owner of a refrigerator wants to purchase a new handle of the correct type, or the owner of a stereo system wants to know which speakers are appropriate for her home theater system, she can simulate the associated RFID tags in order to acquire, carry, and convey this information conveniently. As another example, the owner of an expensive watch might program her REP to simulate the RFID tag of that watch when she is present in upscale shops (so as to improve her level of customer service), but to mask her expensive watch (or simulate a cheap one) when she is walking the streets.

There are numerous other scenarios in which a REP can enforce privacy policies. For example, jewelry retailers typically perform nightly inventories of their stock, given the high value of individual items. One can imagine that they would find RFID-tagging of their stock useful in this process. Such tagging, however, would make it possible for a competitor to scan a jewelry case quickly and in secrecy, and thereby learn the rate of stock turnover. A REP might simulate non-existent jewels to render this more difficult. This approach would, similarly, be very useful in military environments.

Finally, we note that a REP can transmit tag information to devices other than RFID readers. A REP might, for instance, transmit tag data via IEEE 802.11 or other similar protocol, thereby serving as a bridge between an RFID system and other wireless systems.

2.4 Tag Release

When a REP releases an RFID tag, it typically restores the tag's original identity. This process is straightforward if the REP has unrestricted write access to the tag. The technique described in Section 2.2 above for preventing swapping attacks introduces a problem here, however, as its aim is precisely to restrict the identifiers that may be written to a tag. We propose, therefore, that on release of a tag, the randomly assigned portion of its identifier be retained, and that the rest of its identifier be restored to its original state. For example, the identifier on an EPC tag may be viewed as comprising two segments, namely, a first segment identifying the manufacturer and type of a particular product, and a second segment in the form of a unique serial number. During the period in which a tag is simulated by a REP, the first segment can be effaced or otherwise overwritten by the REP, while the second segment, or a portion thereof, is generated at random by the tag. When the tag is released, the randomness in the second segment is retained, while the first segment is restored. Effectively, then, a tag gets a new serial number at the time it is released.

This change in the second segment could be problematic in some cases. For example, if a user has a warranty associated with an item that is referenced by its initial serial number, the user would like to retain that serial number. We note, however, that the REP can help provide serial-number translation as desired. For example, if a carton of milk has had its serial number changed through relabeling, the REP can transfer the old serial number to a "smart" refrigerator when a consumer puts the milk away.

In the case where a tag has an associated PIN, of course, the PIN may be used to place the tag in a special state in which its serial number may be completely rewritten. Alternatively, physical mechanisms like reader proximity, such as that described in the above-cited K. P. Fishkin et al. reference, might be used to trigger tag restoration of its original state.

An important logistical question is how the REP is to determine when to release a tag. This process may in many cases be controlled by the user or performed automatically based on external environmental cues, e.g., when a user's home network informs the REP that the user has entered her home. Experiments described in the above-cited K. P. Fishkin et al. reference suggest that as tags enter the limit of range of a reading device, their response rate degrades. Based on such information, a REP might be able to detect the removal of a tag from its vicinity and restore its initial state automatically. To achieve early detection of impending tag departure from its read radius, a REP might periodically reduce its power level. The opposite is alternatively possible. For example, release of a tag might be effected by bringing the REP into close proximity or actual physical contact with the tag. This latter case has a useful feature, in that physical proximity is effectively a kind of authentication, and might serve as the basis for full restoration of a tag identifier, thereby bypassing the problem of serial-number-changes discussed above. For library books and similar items, this could be especially useful.

2.5 Putting Tags to Sleep

In other embodiments, a REP can put tags to sleep while it is simulating them, and then wake them for identity re-implantation, thereby obviating the need for tag relabeling. Such a "sleep" capability is not supported by the EPC Class-1 Generation-2 standard, but could in principle be incorporated into inexpensive tags. The process of waking, however, can be a problematic one. For logical access control, sleep/wake commands should be keyed with PINs so as to prevent malicious alteration of tag behavior. A problem which arises is that unless a tag identifies itself, a reader (or REP) cannot know which waking key to transmit; a sleeping tag cannot, of course, identify itself. Trial-and-error transmission of PINs to tags would be possible, but cumbersome. Alternatively, it is possible for a REP to broadcast a waking PIN to all tags in its vicinity, but given the likely movement of tags in and out of the field of control of the REP over the course of time, this approach seems impractical for consumer applications. This is particularly the case if a REP wishes to transfer control of a tag to a different device, in that the secondary device must be able to identify the tag of which it is taking control.

Putting tags to sleep might present a more feasible approach to access control if waking involves some form of physical access control. For example, it would be possible to touch an appropriately-configured RFID device to a tag in order to wake it. We expect, however, that it would be cumbersome for consumers to have to engage in a fine-grained physical process to control the state of their tags.

In supply chains, where rigorous logistical controls are available, sleep/wake patterns may be more manageable. In such settings it may make sense for a REP to put tags to sleep while simulating them.

2.6 REPs and the EPCglobal Standard

The basic REP approach of this illustrative embodiment works effectively with Class-1 Generation-2 EPC tags in commercial settings, particularly if such tags have writeable identifiers. Many memory technologies such as EEPROM impose limitations on the number of times memory cells may be rewritten, but some thousands of rewrite operations should be supportable. PIN management would also be essential to prevent swapping attacks, as EPC tags do not support tag-generated randomness in identifiers. Alternatively, the above-noted "block-and-simulate" approach would be workable here.

Unlike the application of REPs to provide personal privacy, REPs in commercial settings would typically manage a limited population of tags. The goal in this situation may be to transport a container of items from one trusted environment such as a factory to another such as a distribution center. This transportation of goods has been a major source of loss for manufacturers and retailers alike.

Using a REP to manage the tags avoids the need to build a new data communications infrastructure among supply chain participants. The key distribution problem is reduced to the authentication of a reader to the REP. REPs by their virtue of relaxed cost constraints could be capable of public-key cryptography. Issuance of digital certificates to REPs and readers would eliminate the need for a new secret-key distribution infrastructure. Upon arrival of a pallet at its destination, the reader and REP would perform public-key-based mutual authentication using their digital certificates. On completion of the protocol, the reader would issue a special command causing the REP to unconceal and relabel all the tags in the pallet with their true identities. Thus, REPs can provide significant advantages in applications involving EPCglobal-enabled supply chains.

The present invention in the illustrative embodiments described above provides devices that can serve as a proxy for RFID tags, simulating such tags to readers, in a manner that enhances user privacy while also maintaining the benefits of tags. The proxy devices of the illustrative embodiments can enforce privacy policies of arbitrary sophistication, taking factors like time and location into account. Proxy devices can efficaciously protect the privacy of consumers and the sensitive information contained in industrial RFID systems, and can withstand attacks against the integrity of tag identifiers, e.g., swapping attacks. In addition to restricting information access where appropriate, a proxy device can also facilitate communications within a given RFID system, and can serve as a bridge between the given RFID system and other types of wireless systems.

It is to be appreciated that the particular configuration, elements and operating parameters of the illustrative embodiments are not requirements of the invention, and should not be construed as limiting the scope of the invention in any way.

For example, the system elements and their configuration as shown in FIGS. 1 and 2 may be varied in alternative embodiments. Similarly, the particular protocol steps in the diagram of FIG. 3 can be varied in alternative embodiments. Those skilled in the art can make these and other modifications in the described embodiments in a straightforward manner.

In addition, although described in the context of EPC tags and associated kill and access PINs, the techniques of the present invention may be implemented in systems which utilize a wide variety of other types of RFID devices and associated control codes. Such control codes may be associated with tag functions other than kill and access.

Furthermore, the various simplifying assumptions made above in the course of describing the illustrative embodiments should also be viewed as exemplary rather than as requirements or limitations of the invention. In alternative embodiments, one or more of these assumptions need not apply.

These and numerous other alternative embodiments within the scope of the appended claims will be readily apparent to those skilled in the art.

What is claimed is:

1. A method of operating a proxy device in an RFID system, the RFID system comprising a plurality of RFID devices and at least one reader which communicates with the proxy device and one or more of the RFID devices, the method comprising the steps of:

acquiring in the proxy device information characterizing at least a given one of the RFID devices;

the proxy device controlling the given RFID device so as to at least partially prevent the given RFID device from being read by the reader, wherein the proxy device controls the given RFID device by communicating with the given RFID device in a manner which causes that RFID device to alter its output; and the proxy device communicating with the reader in a manner which simulates the given RFID device;

wherein designation of the proxy device as such occurs prior to initiation of said controlling; and wherein the proxy device communicates with the reader in a manner which simulates the given RFID device but withholds from the reader information that would otherwise be communicated by the given RFID device to the reader absent said controlling, in order to implement a designated privacy policy established for the given RFID device.

2. The method of claim 1 further including the step of releasing control of the given RFID device subsequent to the communicating step so as to permit said RFID device to again be read by the reader.

3. The method of claim 1 wherein the information characterizing the given RFID device comprises at least an identifier of that device.

4. The method of claim 1 wherein the proxy device acquires at least a portion of the information characterizing the given RFID device by reading the given RFID device in substantially the same manner that the reader would read the given RFID device.

5. The method of claim 1 wherein the proxy device acquires at least a portion of the information characterizing the given RFID device from the reader.

6. The method of claim 1 wherein the proxy device acquires at least a portion of the information characterizing the given RFID device from the given RFID device upon authentication of the proxy device to the given RFID device.

7. The method of claim 1 wherein the controlling step comprises relabeling the given RFID device by altering its identifier as stored therein.

8. The method of claim 7 wherein the identifier is altered by replacing it with a pseudonym generated by the proxy device.

9. The method of claim 8 wherein the proxy device assigns different pseudonyms for different timeslots to the given RFID device.

10. The method of claim 8 wherein the pseudonym is generated uniformly at random by the proxy device and stored in a memory of the proxy device in association with an identifier of the given RFID device.

11. The method of claim 8 wherein the pseudonym is generated as symmetric-key ciphertext based on a master key held by the proxy device.

12. The method of claim 7 wherein the identifier is altered by the given RFID device responsive to input received from the proxy device.

13. The method of claim 12 wherein the given RFID device generates a new identifier responsive to an update command received from the proxy device.

14. The method of claim 13 wherein the given RFID device generates the new identifier as a pseudonym determined using a counter maintained in the given RFID device.

15. The method of claim 8 wherein the pseudonym is generated in the proxy device at least in part as a function of input information obtained from the given RFID device.

16. The method of claim 15 wherein the pseudonym is accepted by the given RFID device only upon confirmation by the given RFID device that the pseudonym was generated using the input information.

17. The method of claim 1 wherein the communicating step comprises communicating with the reader in a manner which implements a desired privacy policy regarding the information characterizing the given RFID device.

18. The method of claim 17 wherein in accordance with the privacy policy the proxy device releases to the reader at least a portion of the information characterizing the given RFID device based on geographic location of the given RFID device.

19. The method of claim 17 wherein in accordance with the privacy policy the proxy device releases to the reader information characterizing at least one of the RFID devices other than the given RFID device in place of at least a portion of the information characterizing the given RFID device.

20. The method of claim 3 wherein the identifier comprises at least a first segment and a second segment, and wherein the controlling step further comprises the proxy device overwriting the first segment in a memory of the given RFID device and the given RFID device generating the second segment.

21. The method of claim 2 wherein the releasing step comprises storing in a memory of the given RFID device at least a portion of an identifier of the given RFID device.

22. The method of claim 21 wherein the portion of the identifier that is stored in the memory of the given RFID device in the releasing step is the same as that obtained in the acquiring step.

23. The method of claim 21 wherein the portion of the identifier that is stored in the memory of the given RFID device in the releasing step is altered from that obtained in the acquiring step.

24. The method of claim 1 wherein the controlling step comprises placing the given RFID device in a sleep mode.

25. The method of claim 1 wherein the identifier comprises an electronic product code (EPC).

26. The method of claim 25 wherein the given RFID device comprises an EPC tag.

27. An apparatus for use in an RFID system comprising a plurality of RFID devices and at least one reader which communicates with one or more of the devices, the apparatus comprising:

a proxy device comprising a processor and a memory coupled to the processor, the proxy device being operative to acquire information characterizing at least a given one of the RFID devices, to control the given RFID device so as to at least partially prevent the given RFID device from being read by the reader, and to communicate with the reader in a manner which simulates the given RFID device;

wherein the proxy device controls the given RFID device by communicating with the given RFID device in a manner which causes that RFID device to alter its output;

wherein designation of the proxy device as such occurs prior to initiation of said control of the given RFID device by the proxy device; and wherein the proxy device communicates with the reader in a manner which simulates the given RFID device but withholds from the reader information that would otherwise be communicated by the given RFID device to the reader absent said control of the given RFID device by the proxy device in order to implement a designated privacy policy established for the given RFID device.

28. An apparatus for use in an RFID system comprising a plurality of RFID devices and at least one reader which communicates with one or more of the devices, the apparatus comprising:

a given RFID device configured for communication with a proxy device of the system, wherein the proxy device is operative to acquire information characterizing the given RFID device, the given RFID device being controllable by the proxy device so as to at least partially prevent the given RFID device from being read by the reader, the proxy device being further operative to communicate with the reader in a manner which simulates the given RFID device, wherein the proxy device controls the given RFID device by communicating with the given RFID device in a manner which causes that RFID device to alter its output;

wherein designation of the proxy device as such occurs prior to initiation of said control of the given RFID device by the proxy device; and wherein the proxy device communicates with the reader in a manner which simulates the given RFID device but withholds from the reader information that would otherwise be communicated by the given RFID device to the reader absent said control of the given RFID device by the proxy device, in order to implement a designated privacy policy established for the given RFID device.

29. An article of manufacture comprising a machine-readable storage medium storing one or more programs for operating a proxy device in an RFID system, the RFID system comprising a plurality of RFID devices and at least one reader which communicates with the proxy device and one or more of the RFID devices, wherein the one or more programs when executed by the proxy device implement the steps of:

acquiring information in the proxy device characterizing at least a given one of the RFID devices;

the proxy device controlling the given RFID device so as to at least partially prevent the given RFID device from being read by the reader, wherein the proxy device controls the given RFID device by communicating with the given RFID device in a manner which causes that RFID device to alter its output; and the proxy device communicating with the reader in a manner which simulates the given RFID device wherein designation of the proxy device as such occurs prior to initiation of said controlling; and wherein the proxy device communicates with the reader in a manner which simulates the given RFID device but withholds from the reader information that would otherwise be communicated by the given RFID device to the reader absent said controlling, in order to implement a designated privacy policy established for the given RFID device.

* * * * *